United States Patent [19]
Grillo et al.

[11] Patent Number: 6,011,247
[45] Date of Patent: Jan. 4, 2000

[54] SYSTEM FOR OPEN AND CLOSED VESSEL MICROWAVE CHEMISTRY

[75] Inventors: Angelo C. Grillo, Boca Raton, Fla.; Paul E. Burgener, Mississauga, Canada

[73] Assignee: Questron Canada Inc., Ontario, Canada

[21] Appl. No.: 09/033,021

[22] Filed: Mar. 2, 1998

Related U.S. Application Data

[60] Provisional application No. 60/046,852, Mar. 3, 1997.

[51] Int. Cl.[7] ...................................................... H05B 6/64
[52] U.S. Cl. ............................ 219/686; 422/113; 422/79; 219/705
[58] Field of Search ..................................... 219/745, 686, 219/687, 688, 679, 702, 705, 707, 733, 756; 23/23 R; 422/21, 113, 78, 79, 119, 102, 186, 99, 67

[56] References Cited

U.S. PATENT DOCUMENTS

| | | | |
|---|---|---|---|
| 4,080,168 | 3/1978 | Abu-Samra et al. | 23/23 OR |
| 4,681,996 | 7/1987 | Collins et al. | 219/10.55 M |
| 4,882,286 | 11/1989 | Neas et al. | 436/175 |
| 5,206,479 | 4/1993 | Zakaria et al. | 215/10.55 F |
| 5,264,185 | 11/1993 | Floyd | 422/113 |
| 5,445,714 | 8/1995 | Myers | 202/176 |
| 5,498,857 | 3/1996 | Jacquault | 219/745 |
| 5,695,720 | 12/1997 | Wade et al. | 422/82 |
| 5,711,857 | 1/1998 | Armstrong | 202/235 |

*Primary Examiner*—Mark Paschall
*Assistant Examiner*—Jeffrey Pwu

[57] ABSTRACT

A microwave system is provided which is capable of performing both open and closed vessel microwave chemistry in an efficient and productive manner. For open vessel chemistries, such as digestions, the system offers a microwave oven with: liquid cooled refluxing of samples; reagent dispensing, and temperature control. The open vessel module can quickly and easily be interchanged with a high pressure module capable of operating at pressures in excess of 600 psi.

17 Claims, 9 Drawing Sheets

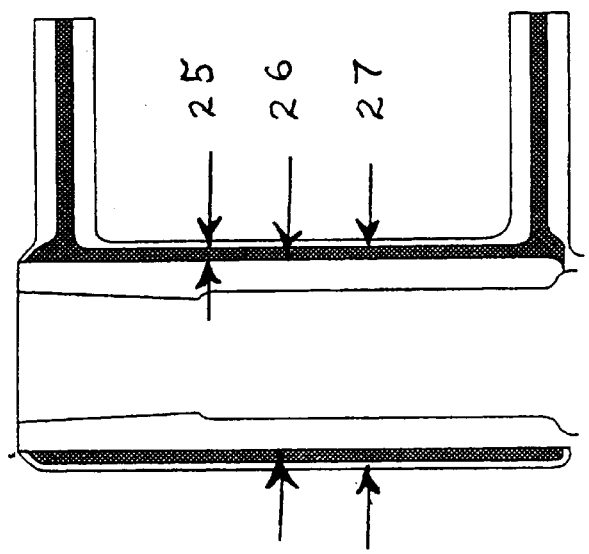
FIG. 5A-3
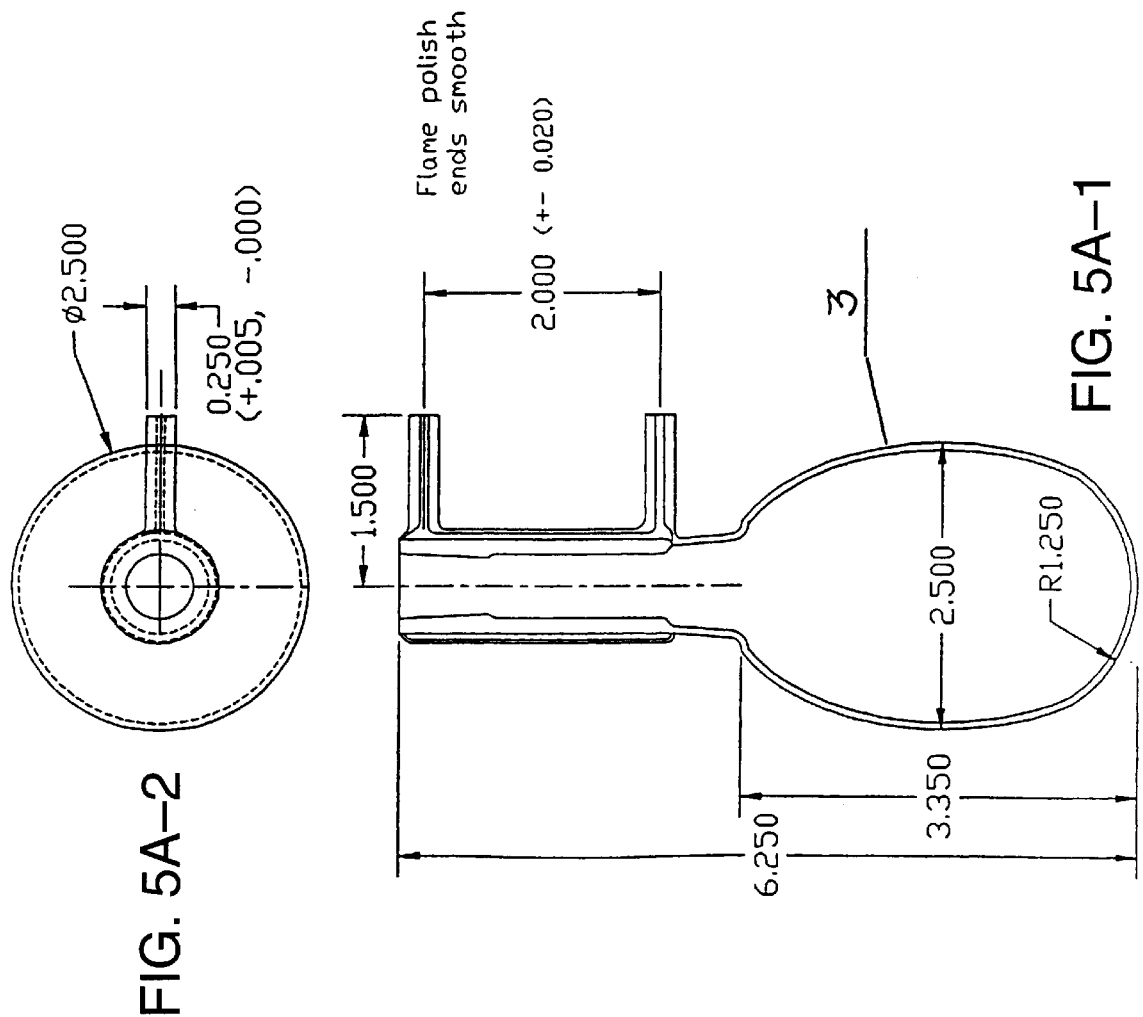
FIG. 5A-2
FIG. 5A-1

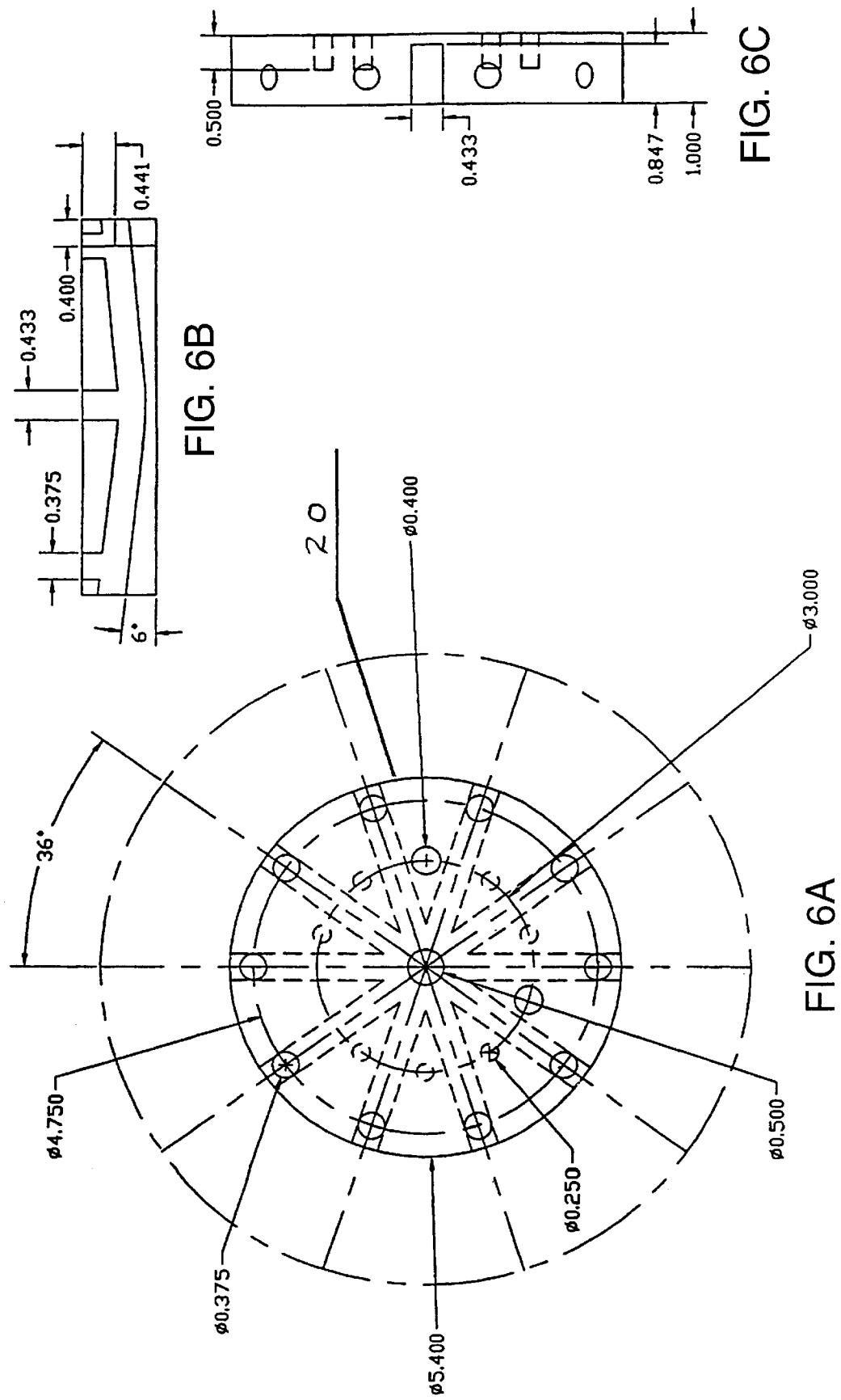

SYSTEM FOR OPEN AND CLOSED VESSEL MICROWAVE CHEMISTRY

This application claims the benefit of Provisional Application No. 60/046,852, filed Mar. 3, 1997, the contents of which are herein incorporated by reference in its entirety.

FIELD OF THE INVENTION

This invention relates to a method and apparatus for microwave chemistries such as digestion, drying, evaporation, extraction, hydrolysis, Kjeldahl, synthesis and others which require some degree of heating for the process to be carried out.

BACKGROUND OF THE INVENTION

Microwave digestion in open vessels has been carried out by others for many years. For instance, in U.S. Pat. No. 4,080,168 to Samra et al. open vessels are used for digestion. Also, in the publication entitled, "Introduction to Microwave Sample Preparation," Kingston et al., American Chemical Society, 1988, a method of open vessel digestion in a microwave oven is described. In such cases the rate of heating and the sample volume were limited by the boiling point of the reagent. Since the walls of the vessels were being heated by the sample, there was no refluxing action to contain the sample and it would spill over if heated too violently.

Most of the subsequent work in this area was directed to microwave systems and vessels for high pressure. For example, U.S. Pat. Nos. 4,904,450 and 5,230,865 to Floyd and Hargett et al. respectively, dealt with the design of vessels and seals for closed vessel microwave digestion at elevated pressures.

In addition, U.S. Pat. No. 5,498,857 to Jacquault does address open vessel digestions. However, in this patent only a portion of each vessel, containing the sample, is enclosed in a microwave application cavity. The remainder of each vessel, which is ambient cooled rather than liquid cooled, is outside the microwave application cavity. Furthermore, the reagent dispensing contained in the system for this patent is also located outside the microwave application cavity. In another U.S. Pat. No. 5,459,302 to Jacquault, a radiation pyrometer is disposed in a chamber of the waveguide directed at one sample which is partially contained within that waveguide.

However, none of the known systems and methods provide both closed and open vessels in one microwave system. The known systems also fail to contain all of the functions within the microwave oven and permit several complete vessels within one microwave cavity. Furthermore, the known systems also do not offer the ability to operate temperature sensing in a microwave oven for controlling the temperature of multiple samples which are totally contained within the microwave oven. It is therefore an object of the present invention to provide a system and method which overcomes the deficiencies of the conventional systems.

SUMMARY OF THE INVENTION

The present invention is directed to a microwave system which is optimized for both closed vessel chemistries and open vessel chemistries. For closed vessel chemistries, known and available high pressure vessels are utilized. For open vessel chemistries, a unique and novel system provides liquid cooled refluxing of open vessels that are completely contained within the microwave oven as described herein.

All of the conventional systems fail to recognize the need to control the open vessel reactions within a microwave oven. The present invention is directed at solving these deficiencies by providing a method and apparatus for performing temperature controlled chemistries in open vessels with efficient refluxing to retain trace elements.

BRIEF DESCRIPTION OF THE DRAWINGS

The invention description below refers to the accompanying drawings, of which:

FIGS. 5, 5a, and 5b illustrate cross sectional views of the vessel and top piece according to embodiments of the present invention;

FIG. 6 illustrates the front, top and side cross sections of the top exhaust platter according to an embodiment of the present invention.

DETAILED DESCRIPTION OF THE PREFERRED EMBODIMENTS

Figure 7:
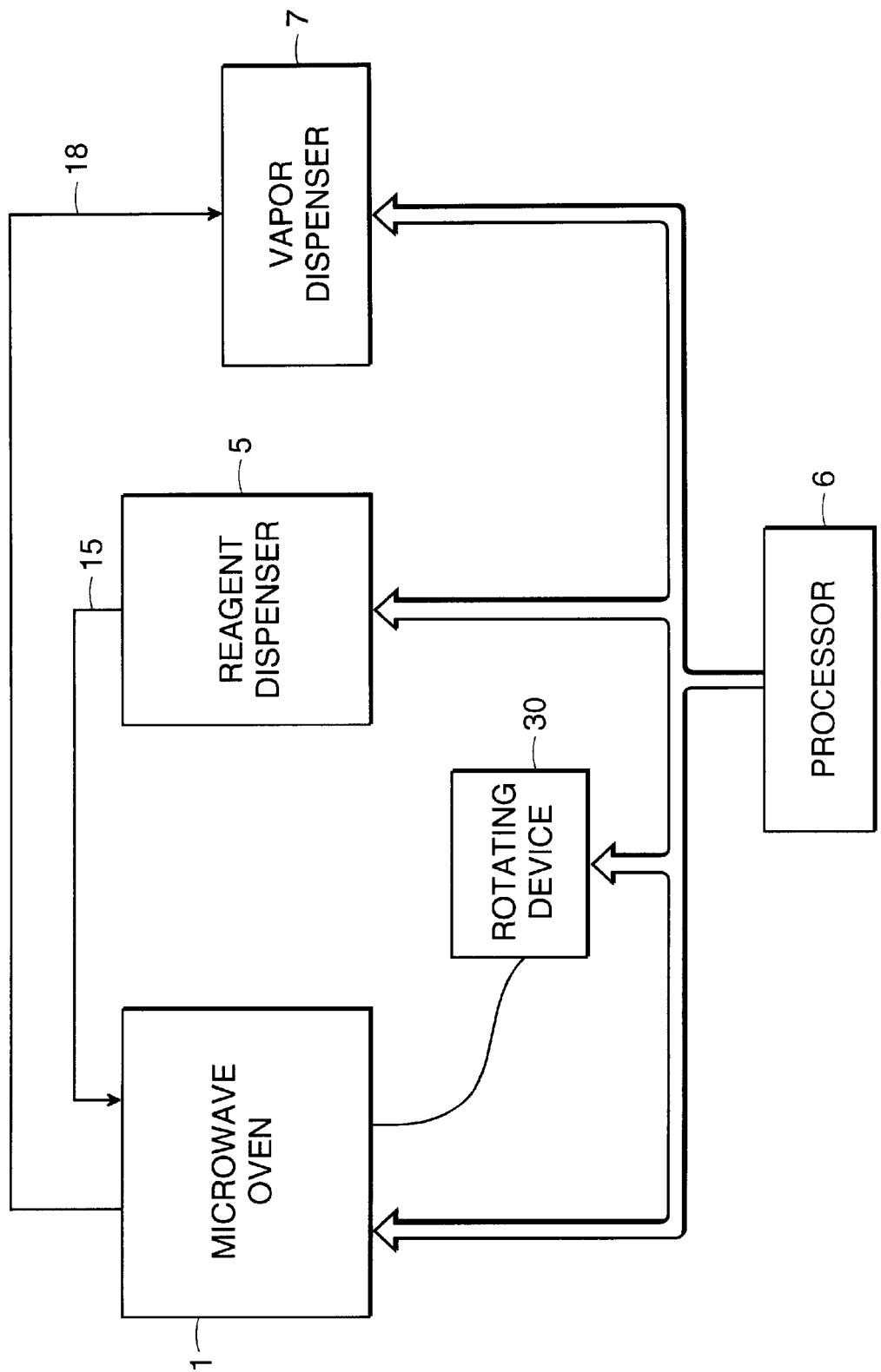
FIG. 7 illustrates a block diagram of the system according to an embodiment of the present invention.

A block diagram of the system according to an embodiment of the present invention is shown in FIG. 7. Elements will be referenced with like numerals throughout the figures unless they are otherwise distinguished. In FIG. 7, a microwave oven 1 is used for receiving modules for both open and closed vessel chemistries. The microwave oven 1 is connected to a reagent dispenser 5 by a dispenser line 15 and to a vapor dispenser 7 by an exhaust line 18. The reagent dispenser 5 dispenses reagents to the microwave oven 1 via the dispenser line 15 and the vapor dispenser 7 is used to exhaust fumes and heat from samples inside of the microwave oven 1 via the exhaust line 18 as the necessity anses in open vessel microwave chemistries. Also connected to the microwave oven 1 is a rotating device 30 for rotating the module placed therein. The reagent dispenser 5, the vapor dispenser 7, and the rotating device 30 are all controlled by a processor 6. The processor 6 is also connected to the microwave oven 1 so that the procedure being performed to the sample can be monitored. This system allows both open and closed vessel chemistries to be performed within the microwave oven 1 by a simple interchange to the required module for holding the sample. Known high pressure vessels may be used for closed vessel chemistries while modules for open vessel chemistries will be described in more detail with reference to FIGS. 1–6.

Figure 1:
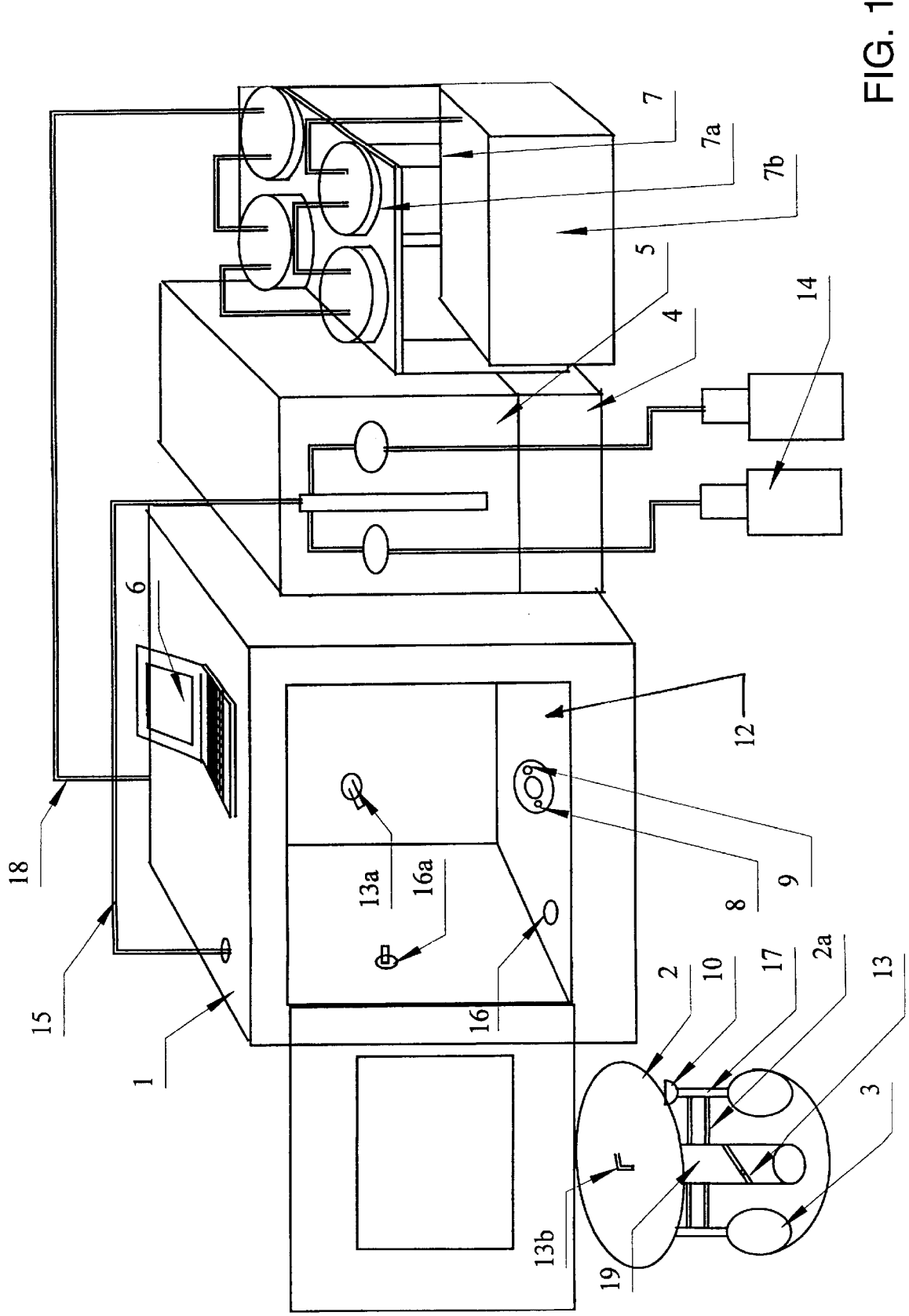
FIG. 1 illustrates a front view of the entire system according to an embodiment of the present invention.

The system's main components according to a specific implementation of the present invention are shown in FIG. 1. They include: the microwave oven 1, the open vessel manifold 2, open vessels 3 (for clarity, only two of the ten vessels for one embodiment are shown in this figure), along with an electronics/valve box 4, the reagent dispenser 5, the processor 6 and the vapor dispenser 7, consisting of scrubber 7a and pump 7b.

Samples may be manually placed in the open vessels 3. The open vessels 3 may then be inserted into individual holder/water outlets 2a, placed in the open vessel manifold 2. Vessel exhaust tops 10 may also be inserted into the open vessel manifold 2 and the entire assembly may be inserted into the microwave oven 1. The open vessel manifold 2 may then be secured to the waterline at a water-input 8 and a water-output 9.

When the open vessel manifold 2 is placed onto the base 12 of the microwave oven 1, a telescoping device 13 may be adjusted to provide a secure fit into the microwave oven 1. An exhaust outlet 13b of the open vessel manifold 2 may then be connected to an exhaust line connection 13a of the microwave oven 1 so that the system is may perform an open vessel chemistry operation.

In a typical procedure, samples in the open vessels 3 are heated in the microwave oven 1. One or more reagents are dispensed from containers 14 of the reagent dispenser 5, through a dispensing line 15 to the vessel exhaust tops 10. The type, amount and rate of dispensing is specified in the program that is controlled by the processor 6, such as a personal computer or the like. The program also specifies the temperature and its rate of increase. The open vessel manifold 2 may be rotated by a rotating device 30 connected to the open vessel manifold 2 at the base of the microwave oven 1 and the temperature in each of the open vessels 3 may be monitored by an infrared thermal sensor 16 mounted in the base 12 of the microwave oven 1. Monitoring may be done through a device, such as a circuit, incorporated in or adjacent to the infrared thermal sensor 16 which records the temperature of each of the open vessels 3 as they rotate and pause above the infrared thermal sensor 16. The temperature may be monitored by the processor 6 which controls the temperature based on the programmed application. The position of the open vessels 3 is monitored for temperature sensing and reagent dispensing by a position sensor 16a which is mounted in the microwave oven 1.

During the heating procedure the samples, in each of the open vessels 3, may begin to boil and fume, in an attempt to escape and, in doing so, would result in a loss of elements. This is prevented by the thin liquid cooled channel 17, (which, in one embodiment, may be a jacket around the neck of the open vessel 3). Fumes which come into contact with the liquid cooled channel 17, are condensed and flow back into the bottom of the open vessel 3.

The cooling liquid can be microwave transparent. For example, tap water, a microwave absorbing liquid, may be utilized as the microwave absorbing liquid because of its convenience and availability. The liquid cooling channel 17 has been designed to minimize the absorption of microwaves by the liquid in the cooling channel 17 but also to enable the liquid to quite efficiently absorb heat from the sample. Therefore, the liquid, by remaining transparent to microwave energy, does not appreciably reduce the efficiency of the microwave heating system, while remaining very efficient for absorbing heat from the sample in the open vessel 3, and thus preventing evaporation and loss of sample.

The liquid cooling channel 17 also conducts heat away from the vessel top 10. This enables the vessel top 10 to remain sufficiently cool to stop any condensable fume which may not have been refluxed by the liquid cooling channel 17. Non-condensable fumes, however, may be sucked through the vessel top 10, the open vessel manifold 2, and an exhaust line 18 to the vapor dispenser 7.

Before, in between and after the heating procedure, additional dispensing steps may be performed, responsive to the programmed processor 6 which specifies: when to dispense; which reagents to dispense; how much to dispense; and at what rate to dispense. After the heating procedure, the operator may wish to evaporate the reagent in the open vessel 3 with minimal loss of the sample. In this case the program will have included steps to: select higher power or higher temperature; reduce liquid cooling; and change the rate of exhaust.

Upon completion of the entire program the electronics/valve box 4 will cease supplying water through the water-input 8 and the holder/water outlets 2a and purge air through these lines. This will remove the liquid from the lines and allow the operator to remove the manifold and vessels with little or no water spillage.

Figure 2:
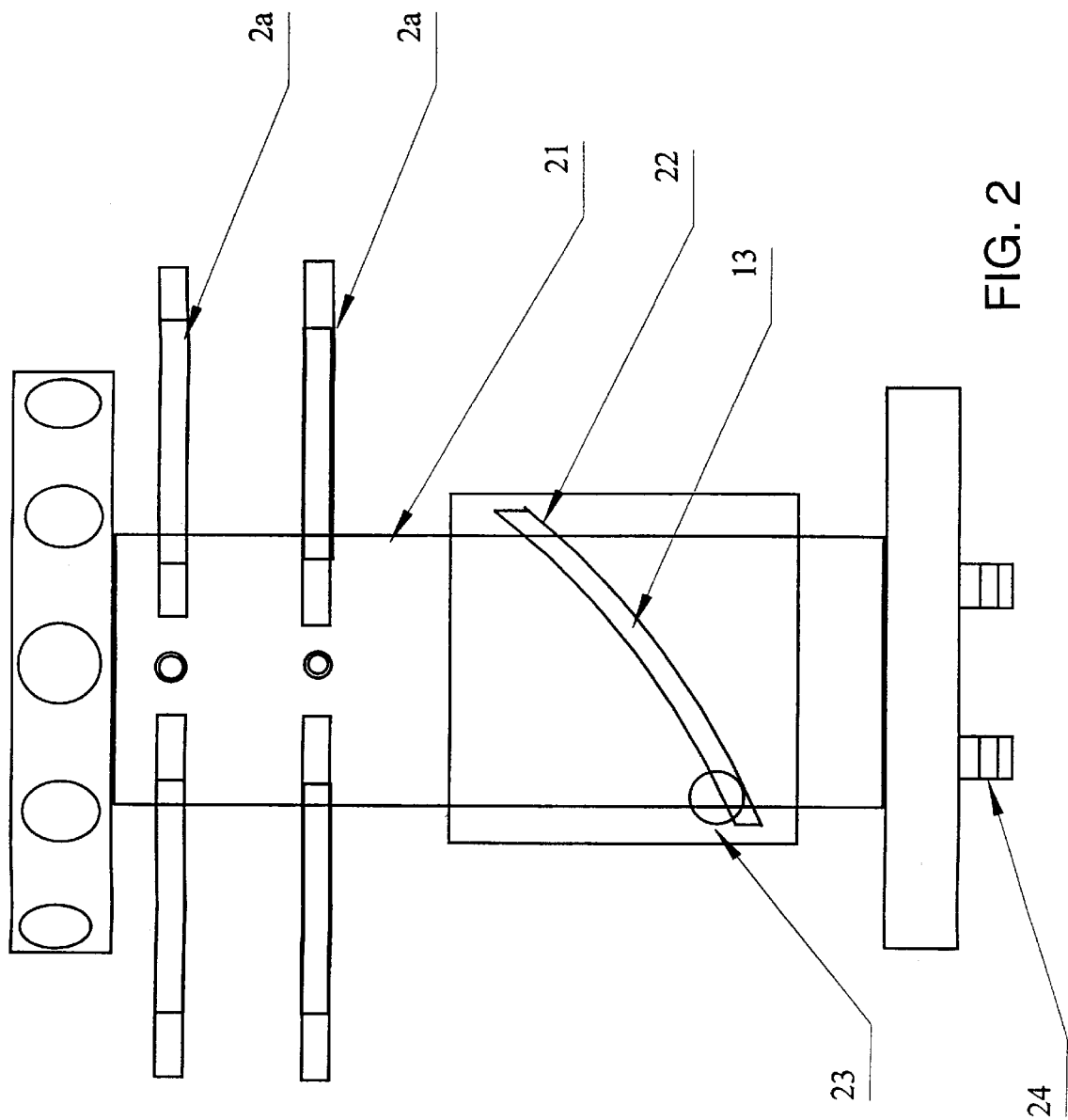
FIG. 2 illustrates a front view of the manifold according to an embodiment of the present invention.
Figures 3A, 3B:
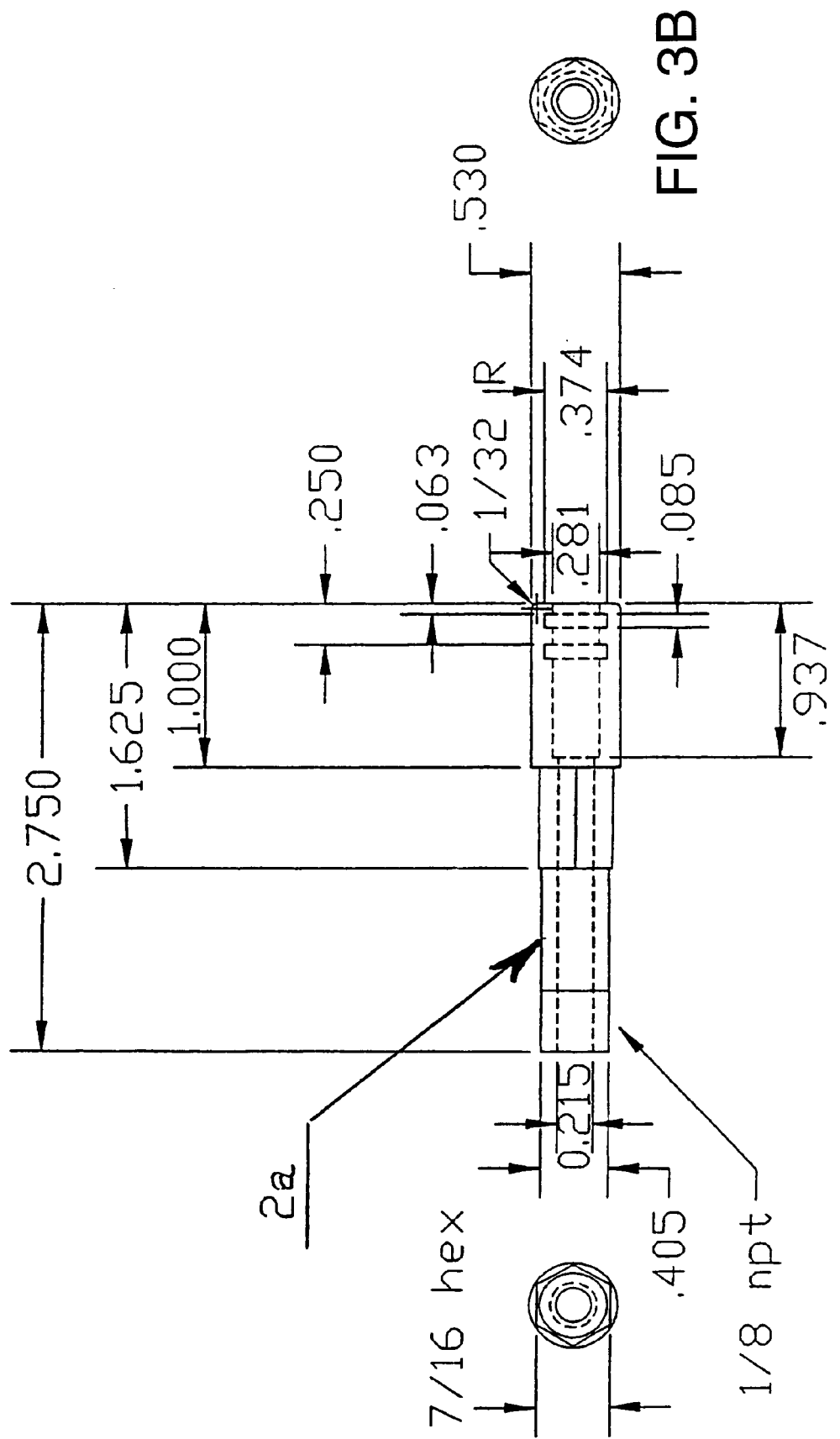
FIG. 3 is a cross section of the holder/water outlet according to an embodiment of the present invention.
Figure 4A:
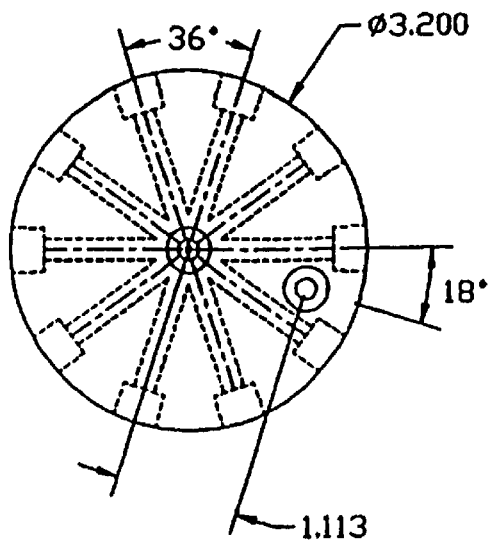
FIG. 4 illustrates front, top and bottom views of the distribution assembly according to an embodiment of the present invention.
Figure 4B:
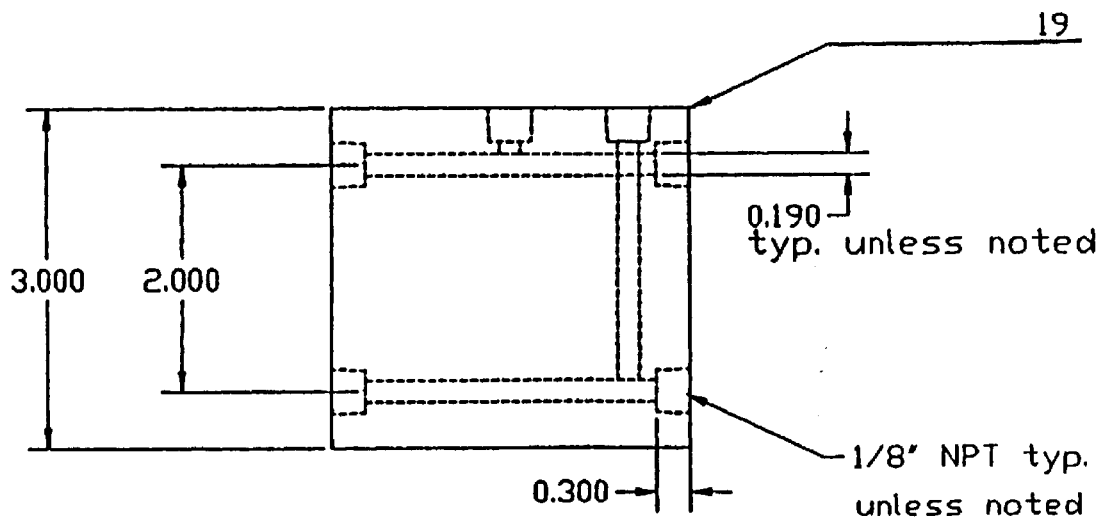
Figure 4C:
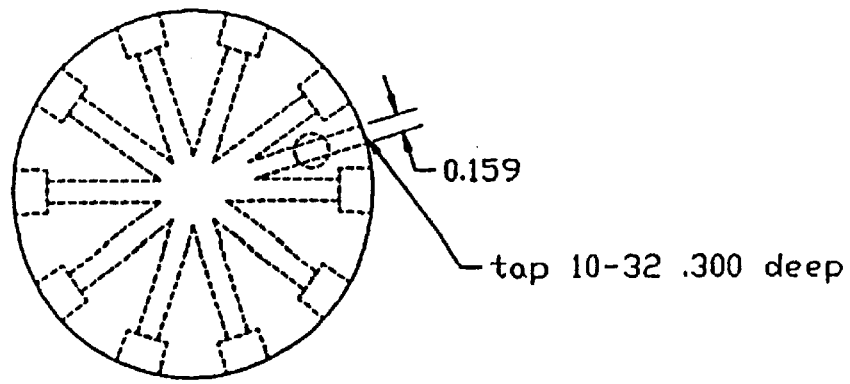

The open vessel manifold 2, shown in more detail in FIG. 2, includes: a center column 21; ten holder/cooling outlets 2a, as shown in FIG. 3, a distribution assembly 19, as shown in FIG. 4, and an upper exhaust platter 20, as shown in FIG. 6.

The center column 21 may be fabricated from aluminum or other microwave reflecting material. The telescoping assembly 13 may be made from PTFE or other acid resistant materials. The center column may contain a groove 22 and a locking pin 23. As the telescoping assembly 13 is rotated, the groove 22 moves through the locking pin 23 to raise the center column 21. When the working height is reached, the locking pin 23 engages. To remove the open vessel manifold 2 from the microwave oven 1, the procedure is reversed.

Liquid may enter the open vessel manifold 2 through two water line connectors 24, as shown in FIG. 2, which fit into the water-input 8 and the water-output 9 in the base 12 of the of the microwave oven 1. In order to prevent twisting of water lines, the open vessel manifold 2 may be controlled by the rotating device 30 to rotate 360° and then reversing the rotation in the opposite direction.

As shown in FIGS. 2 and 3, the holder/water outlets 2a are mounted in the center column 21 of the open vessel manifold 2. Liquid enters the distribution assembly 19, as shown in FIG. 4, which directs the liquid into one row of the holder/water outlets 2a (the lower row in the present embodiment). From there the liquid flows through a cooling channel 25, as shown in FIG. 5a, of the open vessel 3 and back out through the other row of holder/water outlets 2a and the distribution assembly 19.

Figure 5:
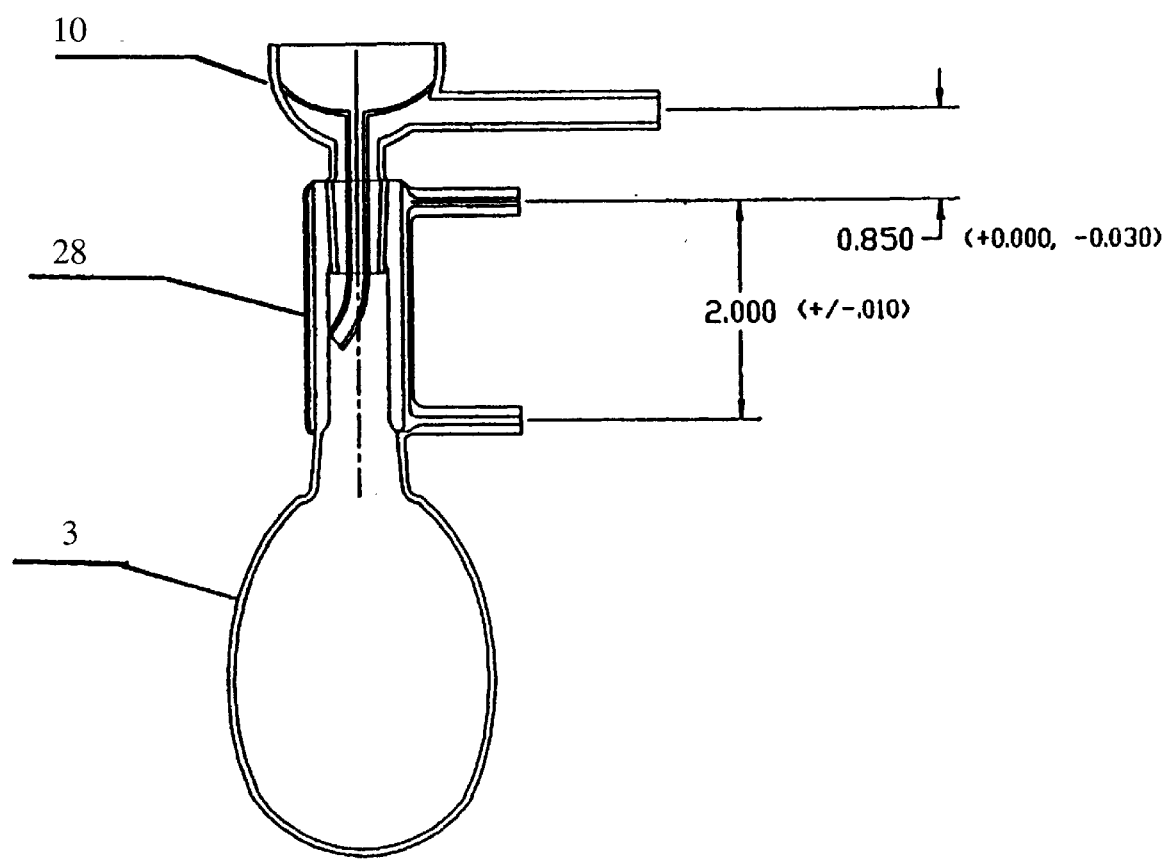
Figure 5B:
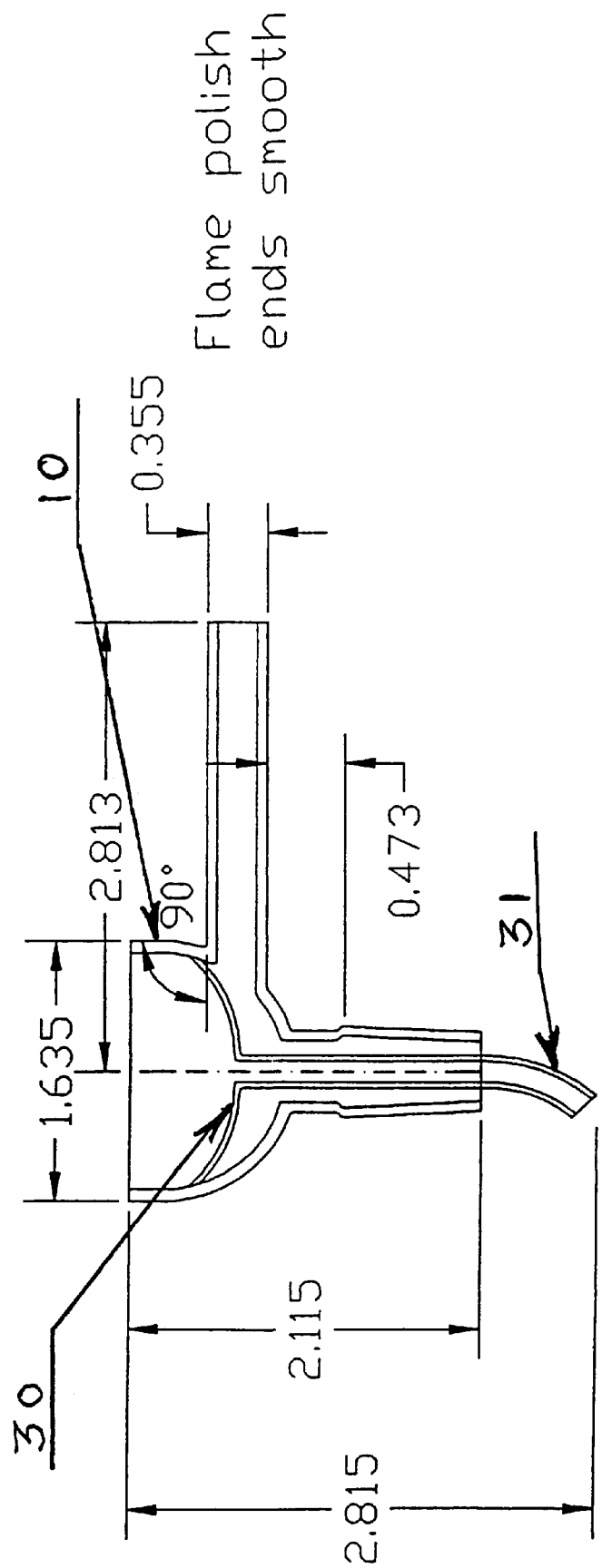

An embodiment of the open vessel 3 is shown in detail in FIGS. 5, 5a and 5b. The open vessel 3 may be fabricated in glass, quartz, PTFE, PFA, TFM or other materials which are acid resistant, heat resistant and microwave transparent. The shape and volume of the open vessel 3 can vary based upon the type of reagent, the temperature, the volume required and/or the level of impurities required. The dimensions which must be restricted are the width of the cooling channel 25, as shown in FIG. 5a, formed by the outer diameter of the vessel neck 26 and the inner diameter of the outer tube 27. These dimensions must be restricted to less than 0.25 of the wavelength of the microwave energy applied in the liquid medium. In the present embodiment, with water as the liquid, this dimension is 2 mm (less than 0.25×the wavelength of microwaves at 2450 MHz in water). The purpose of restricting this dimension is to prevent appreciable absorption of microwave energy by the cooling liquid. In order to further reduce absorption of microwave energy from the sides, the cooling channel 25 can also include, along its length, a sleeve or coating of metal (or other microwave reflecting material). In another embodiment for this cooling channel 25, a tube, coiled around the vessel neck 29 may be used, such that the inner diameter of this tube is less than the 0.25×the wavelength on the applied microwave energy in the liquid.

The vessel tops 10 shown in detail in FIG. 5*b* serve a dual purpose. The vessel tops collect reagents in an upper bowl 30 and guide the reagents, through a spout 31, so that the reagents flow along the side of the open vessel 3 without splashing. The vessel tops 10 also direct the non-condensable fumes from the open vessel 3, through the top exhaust platter 20, as shown in FIG. 6, through the vapor exhaust line 18 and into the vapor dispenser 7.

The foregoing description has been directed to specific embodiments of the invention. It will be apparent, however, that other variations and modifications may be made to the described embodiments, with the attainment of some or all of their advantages.

What is claimed is:

1. A method for performing microwave chemistry in open vessels, comprising the steps of:
    (a) microwave heating multiple samples in open vessels;
    (b) rotating said open vessels of the multiple samples within a microwave oven;
    (c) refluxing to contain the multiple samples within said open vessels during the microwave heating process;
    (d) reagent dispensing before, during and after microwave application; and
    (e) removing fumes during the microwave heating procedure so that microwave chemistry may be performed on the multiple samples contained in said step (c).

2. The method according to claim 1, further comprising the steps of controlling and monitoring the temperature of the multiple samples in said open vessels.

3. The method according to claim 1, further comprising the step of introducing a microwave absorbing liquid into the microwave for cooling the multiple samples in said open vessels by refluxing during the microwave heating process.

4. The method according to claim 3, wherein said microwave absorbing liquid is water.

5. The method according to claim 3, wherein said microwave absorbing liquid flows through a jacketed vessel and a microwave reflecting manifold so that the absorption of microwaves is minimized.

6. An apparatus suitable for microwave chemistry, comprising:
    a microwave oven;
    a manifold for holding multiple samples contained in sealed high pressure closed vessels and refluxing open vessels, supplying liquid cooling and providing a convenient path for fume exhaustion for said open and closed vessels;
    a multiple reagent dispensor for introducing reagents into the microwave oven; and
    an exhaust module for removing fumes directly from said open vessels within the microwave oven without contaminating the interior thereof so that microwave chemistry may be performed on the multiple samples contained in said closed vessels and the multiple samples contained in said open vessels.

7. The apparatus according to claim 6, further comprising an infrared thermal processor for monitoring and controlling the temperature applied to the multiple samples.

8. The apparatus according to claim 6, further comprising a reflecting manifold for holding a plurality of vessels and circulating a cooling liquid to remove fumes.

9. The apparatus according to claim 8, further comprising means for removing samples from the microwave oven, changing vessels and switching vessels to another one of the manifolds.

10. The apparatus according to claim 8, further comprising a telescoping mechanism for enabling said reflecting manifold and said plurality of vessels to be easily and quickly fitted in place, removed, and switched in the microwave oven.

11. The apparatus according to claim 6, further comprising a valve controller for supplying cooling liquid at rates consistent with refluxing and at slower rates consistent with evaporation.

12. The apparatus according to claim 11, further comprising an air purger for removing liquid from liquid flow channels while the manifold and said open and closed vessels are placed in the microwave oven.

13. The apparatus according to claim 6, further comprising a processor for monitoring and controlling the microwave chemistry processes performed on the multiple samples.

14. The apparatus according to claim 13, wherein said processor is a personal computer.

15. The apparatus according to claim 6, wherein said open vessels comprise microwave reflecting, cooling liquid flow channels for minimizing the absorption of microwaves by the liquid while absorbing heat from the multiple samples in order to regulate evaporation of the multiple samples.

16. The apparatus according to claim 15, wherein said microwave reflecting, cooling liquid flow channels are disposed at neck or mid-portions of said vessels.

17. The apparatus according to claim 15, further comprising a top piece for dispensing reagents from the microwave oven with minimal splashing, and assisting condensation and returning of the multiple a samples which evaporate and are then cooled by said microwave reflecting, cooling liquid flow channel.

* * * * *